US006988683B2

(12) United States Patent
Whettingsteel

(10) Patent No.: US 6,988,683 B2
(45) Date of Patent: Jan. 24, 2006

(54) APPARATUS FOR CRUSHING GLASS OR CERAMIC MATERIAL

(75) Inventor: Stephen Whettingsteel, Butlocks Heath (GB)

(73) Assignee: Global Eneco Limited, Southampton (GB)

( * ) Notice: Subject to any disclaimer, the term of this patent is extended or adjusted under 35 U.S.C. 154(b) by 264 days.

(21) Appl. No.: 10/239,337

(22) PCT Filed: Mar. 20, 2001

(86) PCT No.: PCT/GB01/01216

§ 371 (c)(1),
(2), (4) Date: Sep. 20, 2002

(87) PCT Pub. No.: WO01/70408

PCT Pub. Date: Sep. 27, 2001

(65) Prior Publication Data

US 2003/0062432 A1 Apr. 3, 2003

(30) Foreign Application Priority Data

Mar. 22, 2000 (GB) .................................... 0006976
Nov. 29, 2000 (GB) .................................... 0029213

(51) Int. Cl.
*B02C 19/14* (2006.01)

(52) U.S. Cl. ............................ 241/79; 241/80; 241/99; 241/100; 241/152.2; 241/167

(58) Field of Classification Search .................. 241/97, 241/80, 99, 79, 152.2, 167
See application file for complete search history.

(56) References Cited

U.S. PATENT DOCUMENTS 5,094,392 A * 3/1992 Szombathy ................. 241/167
5,215,265 A 6/1993 Lodovico ..................... 241/99
5,484,109 A * 1/1996 Cook .......................... 241/73
5,505,390 A 4/1996 Rodgers ...................... 241/48
5,938,132 A 8/1999 Shinjo et al. ............. 241/79.1
6,032,883 A * 3/2000 Hansen ...................... 241/24.3
6,073,866 A 6/2000 Silver et al. .................. 241/19

FOREIGN PATENT DOCUMENTS

DE 44 27 462 A1 2/1996
EP 0865826 * 9/1998
EP 0 990 466 A1 4/2000
FR 2698024 * 5/1994
WO 96/23587 * 8/1996

* cited by examiner

*Primary Examiner*—Mark Rosenbaum
(74) *Attorney, Agent, or Firm*—Iandiorio & Teska

(57) ABSTRACT

Apparatus (2) for crushing glass or ceramic material, which apparatus (2) comprises a rotor (4), rotor blades (6) on the rotor (4), at least one stationary blade (8) which cooperates in use with the rotor blades (6) as the rotor (4) rotates, and a chamber (16) for receiving crushed glass or ceramic material (18), the apparatus (2) being such that the rotor (4) is upstream of the chamber (16), the glass or ceramic material (18) is first broken into fragments (20) on impact with the rotor (4), the fragments (20) are reduced in size and formed into cullet (22) by passing through a gap (24) between the rotor blades (6) and the stationary blade (8), and the action of the rotor blades (6) and the stationary blade (8) causes the cullet (22) to be such that it will not cut, is safe for handling, and is suitable for further use without further processing.

16 Claims, 6 Drawing Sheets

APPARATUS FOR CRUSHING GLASS OR CERAMIC MATERIAL

FIELD OF THE INVENTION

This invention relates to apparatus for crushing glass or ceramic material.

BACKGROUND OF THE INVENTION

The disposal of glass and ceramic material presents problems. More specifically, apparatus for crushing glass is known. The known apparatus crushes the glass with a view to reducing the volume occupied by the glass so that the glass can then be more easily handled. The crushed glass contains very sharp fragments which make the glass dangerous to handle. This in turn severely restricts any possible further use to which the glass fragments can be put. Currently, commercial uses for crushed glass are limited to asphalt grog for roads, and shot blasting media in small volumes. The vast majority of the crushed glass is simply disposed of as a land fill waste material. Such disposal of the crushed glass is not especially ecologically friendly, and the land fill sites must be such that the crushed glass is buried sufficiently deeply that its sharp edges cannot harm human and animals. Also, there are collection costs for collecting the crushed glass prior to disposal.

Ceramic material may also need to be crushed with a view to reducing the volume occupied by the ceramic material so that the ceramic material can then be more easily handled. If the ceramic material is glazed, the crushed ceramic material may contain sharp fragments, which then give rise to the same type of problems as those mentioned above for glass. Some ceramic material is not glazed, but it is often not economically possible to separate glazed and non-glazed ceramic material.

SUMMARY OF THE INVENTION

It is an aim of the present invention to obviate or reduce the above mentioned problems associated with the disposal of glass and ceramic material.

Accordingly, the present invention provides apparatus for crushing glass or ceramic material, which apparatus comprises a rotor, rotor blades on the rotor, at least one stationary blade which cooperates in use with the rotor blades as the rotor rotates, and a chamber for receiving crushed glass or ceramic material, the apparatus being such that the rotor is upstream of the chamber, the rotor is rotated at 1200–2800 revolutions per minute, the glass or ceramic material is fed to the rotor at a feed speed of 3–75 meters per second, the glass or ceramic material is first broken into fragments on impact with the rotor, the fragments are reduced in size and formed into cullet by passing through a gap between the rotor blades and the stationary blade, and the action of the rotor blades and the stationary blade causes the cullet to be such that it will not cut, is safe for handling, and is suitable for further use without further processing.

The apparatus of the present invention is extremely advantageous in that the product cullet does not have sharp edges. The cullet can be safely handled without fear of persons or animals being cut. Thus the cullet can immediately be used for a wide variety of purposes and there is no need for the cullet to be used as a land fill waste material. The cullet of the present invention may be used instead of sand on golf greens as a drainage material which allows water to pass through the drainage material. The cullet may also be used as an in-fill material for drainage ditches. The cullet may still further be used as decorative finishes in horticulture, and also as a slug repellant material. Generally, the cullet may be used for a wide variety of purposes, and with the advantage that the cullet is a cheap material that would otherwise have just gone to waste.

As indicated above, the rotor is rotated at 1200–2800 revolutions per minute, and the glass or ceramic material is fed to the rotor at a feed speed of 3–75 meters per second. Such rotational speeds for the rotor and such feed speeds for the glass or ceramic material help to produce the required cullet. The rotor may be rotated at, for example, 1550 revolutions per minute.

The apparatus is preferably one in which the glass or ceramic material is fed to the rotor at a feed speed of 3–75 meters per second. Such a feed speed is again a preferred contributory factor to producing the required cullet. A presently preferred feed speed is 3 meters per second. However, alternative feed speeds may be used.

The apparatus will usually be one in which the rotor is positioned above the chamber. The rotor may however be positioned elsewhere if desired.

Preferably, the stationary blade is an adjustable stationary blade for the purpose of adjusting the gap between the rotor blades and the stationary blade in order to vary the size of the cullet. Cullet of different sizes may have different further uses. For example, cullet for use in place of sand on golf greens will generally be of a smaller particle size than cullet for use in drainage ditches.

The apparatus of the invention may include retention seals for retaining dust in the chamber. The dust is formed as a result of the crushing of the glass or the ceramic material. The dust is generally formed of silica in the case of crushing glass. The retention seals may be located around a drive shaft for the rotor.

The apparatus of the present invention may also include drive means for the rotor. The drive means may be hydraulic, electrical, electromechanical, belt drive or gear drive. Any suitable and appropriate type of drive means may be employed.

The apparatus of the present invention may include a feed chute along which the glass or ceramic material passes for correct presentation to the rotor. In one embodiment of the present invention, the feed chute is an elbow feed chute. Such a feed chute may be designed for the manual feeding of bottles and it is preferably designed such that a person cannot put their arm so far into the feed chute that the rotor can be engaged.

Preferably, the feed chute includes a lining for preventing erosion of the feed chute adjacent the rotor. The lining is thus able to deal with the effects of the imploding glass or ceramic material in the region of the feed chute adjacent the rotor. Preferably, the lining is a ceramic lining, a composite lining, or a wear-resistant steel lining. Other types, of lining may however be employed.

The apparatus of the present invention may include feed means for feeding the glass or ceramic material to the rotor. Depending upon the type of construction of the apparatus, the feeding may be by gravity feeding or force feeding. The gravity feeding can be done manually. The force feeding can be done by a conveyor or a bucket on a vehicle such as a tractor.

The apparatus of the present invention may include cullet grading means for grading the cullet into different predetermined particle sizes for different predetermined further uses.

The cullet grading means may be a rotary screening device, or a vibration screening device. Other types of cullet grading means may be employed.

The apparatus of the present invention may include filter means for removing dust from the apparatus. The dust will usually be silica dust in the case of glass being crushed by the apparatus.

The filter means may remove the dust firstly at a base part of the crushing chamber, and secondly at the grading screens when grading screens are employed.

The apparatus may include conveyor means for conveying the graded cullet to a storage container.

The apparatus may include re-circulating means for re-circulating graded cullet of a certain particle size for re-processing into cullet of a smaller particle size.

The apparatus may include filter means for filtering any fluid contained in the glass or ceramic material prior to crushing, the filter means being such as to separate contaminates from water whereby the water can be freely discharged to waste. For example, the glass initially delivered to the apparatus of the present invention may be in the form of bottles containing contaminates such for example as alcohol or oil. Such contaminants cannot be discharged down normal local drainage systems and so they need to be separated. By separating them from the water, the water can be discharged and only the relatively small volumes of contaminants need to be retained for specialised disposal.

The apparatus may include a pre-breaking device for breaking up large pieces of glass or ceramic material before the glass or ceramic material is introduced to the remainder of the apparatus for crushing. The use of the pre-breaking device is advantageous where the glass or ceramic material is initially in the form of large sheets which are oversize for feeding to the rotor.

The pre-breaking device may be a crusher or a shredder. Other types of pre-breaking device may be employed.

The apparatus may include a ferrous/non-ferrous separator located at the pre-breaking part of the apparatus.

The apparatus of the invention may be constructed to be mobile if it is desired to take the apparatus to various sites. Alternatively, the apparatus may be constructed to be stationary in which case the glass or ceramic material has to be brought to the apparatus. Where the apparatus is constructed to be mobile, the apparatus may include coupling means for coupling the apparatus to a vehicle, thereby allowing for easy use of the apparatus in more isolated areas.

The apparatus may be one in which there is one of the rotors for each one of the chambers. Alternatively, the apparatus may be one in which there are two or more of the rotors for each one of the chambers. The number of rotors is chosen to give the required crushing surface between rotor blades and stationary blade.

The apparatus may include a cleaning stationary blade which operates to clean the rotor blades with a scraping action as the rotor rotates.

The apparatus may include a post process drier for drying the cullet.

The apparatus of the present invention is able to operate with glass or ceramic material of a wide variety of types, shapes and sizes. Thus, for example, the glass may be in the form of bottles, jars, windscreen glass, laminate glass, plate glass and window glass.

BRIEF DESCRIPTION OF THE DRAWINGS

Embodiments of the invention will now be described solely by way of example and with reference to the accompanying drawings in which.

DETAILED DESCRIPTION OF THE DRAWINGS

Figure 1:
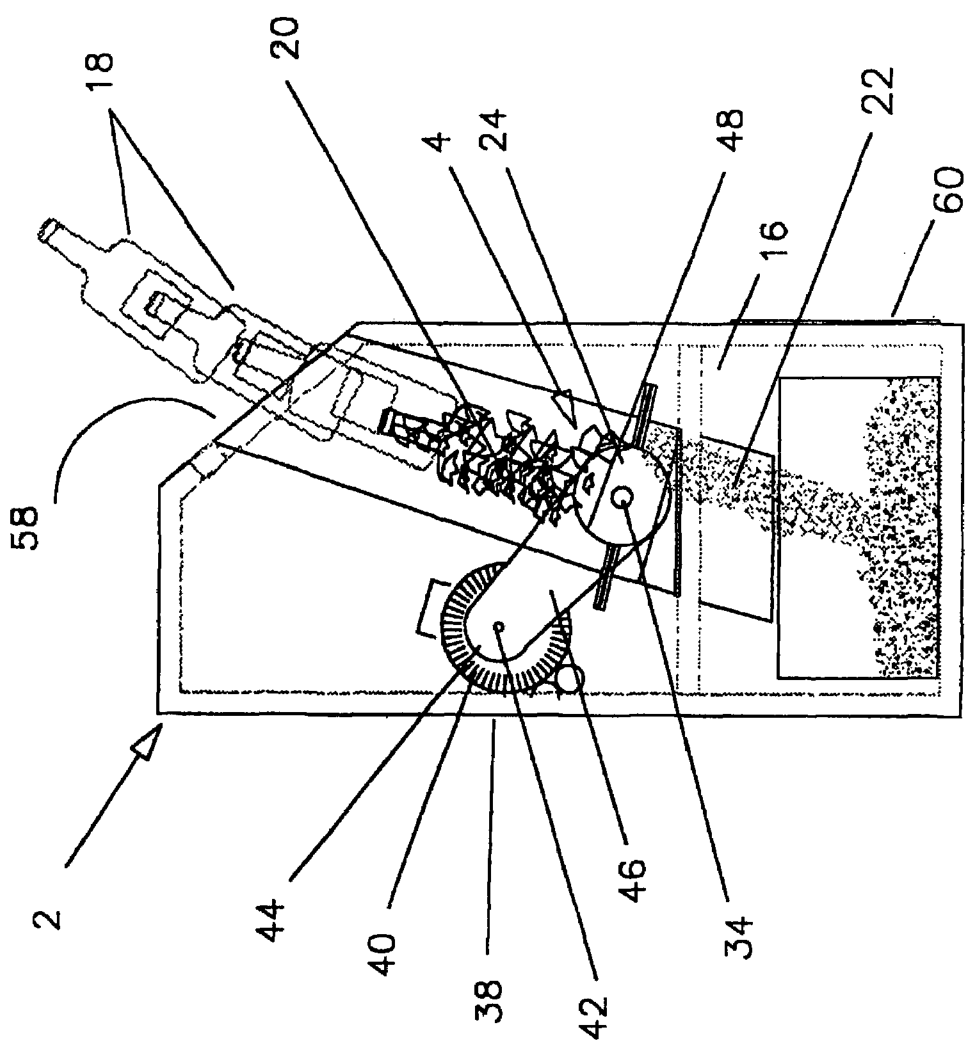
FIG. 1 shows schematically first apparatus for crushing glass.

Referring to FIGS. 1–4, there is shown first apparatus 2 for crushing glass. The apparatus 2 comprises a rotor 4, rotor blades 6 on the rotor, and a stationary blade 8 which co-operates in use with the rotor blades 6 as the rotor 4 rotates. As can be seen from FIGS. 2 and 4, the rotor blades 6 are separately formed from the rotor 4 and they are secured to mounting portions 10 of the rotor 4 by bolts 12 which pass through holes 14 in the rotor blades 6. The bolts 12 may alternatively be clamps (not shown).

The apparatus 2 also comprises a chamber 16 for receiving crushed glass. As can be seen from FIGS. 1 and 2, the rotor 4 is upstream of the chamber 16 by being mounted above the chamber 16.

As can be seen from FIG. 1, glass in the form of bottles 18 is fed to the apparatus 2. The glass in the form of the bottles 18 is first broken into fragments 20 on impact with the rotor 4. The glass fragments 20 are then reduced in size and formed into cullet 22 by passing through a gap 24 between the rotor blades 6 and the stationary blade 8. The action of the rotor blades 6 and the stationary blade 8 causes the cullet 22 to be such that it will not cut, is safe for handling, and is suitable for further use without further processing.

During use of the apparatus 2, the rotor 4 rotates at 1750 revolutions per minute. Bottles 18 are fed to the rotor at a feed speed of 60 meters per second. The glass bottles 18 can be fed manually or automatically. As can be seen from FIG. 1, the glass bottles enter the apparatus 2 and are directed towards the rotor 4 by a chute 26. The glass bottles 18 fall under gravity down the chute 26 until they strike the rotor 4 whereupon they implode. The imploded glass fragments drop down on to the rotor 4 and pass through the gap 24 where they are further reduced in, size to the cullet 22.

The stationary blade 8 is an adjustable stationary blade 8. Thus the size of the cullet 22 is able to be controlled by moving the stationary blade 8 towards or away from the rotor blades 6 in order to vary the size of the gap 24. By appropriately varying the size of the gap 24, the cullet 22 is able to be reduced in size right down to a powder if desired.

Figure 2:
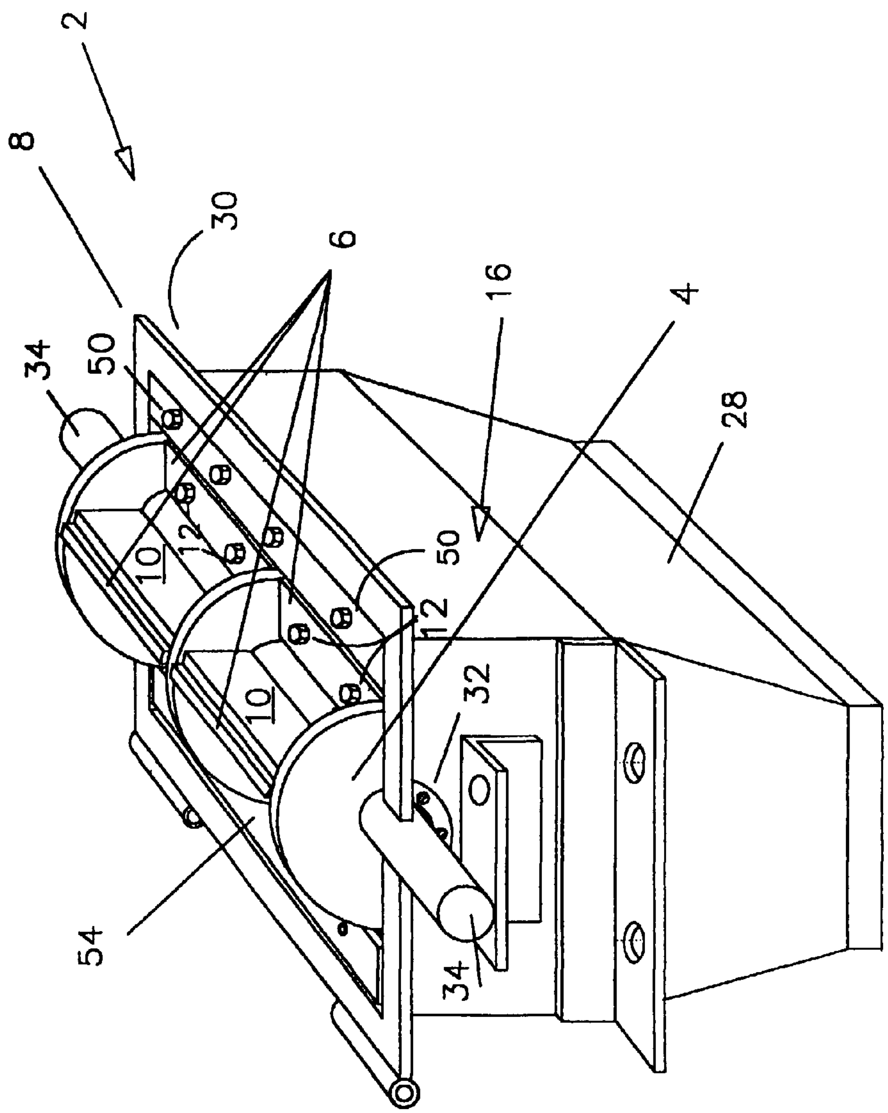
FIG. 2 shows in detail part of the first design of apparatus for crushing glass.
Figure 3:
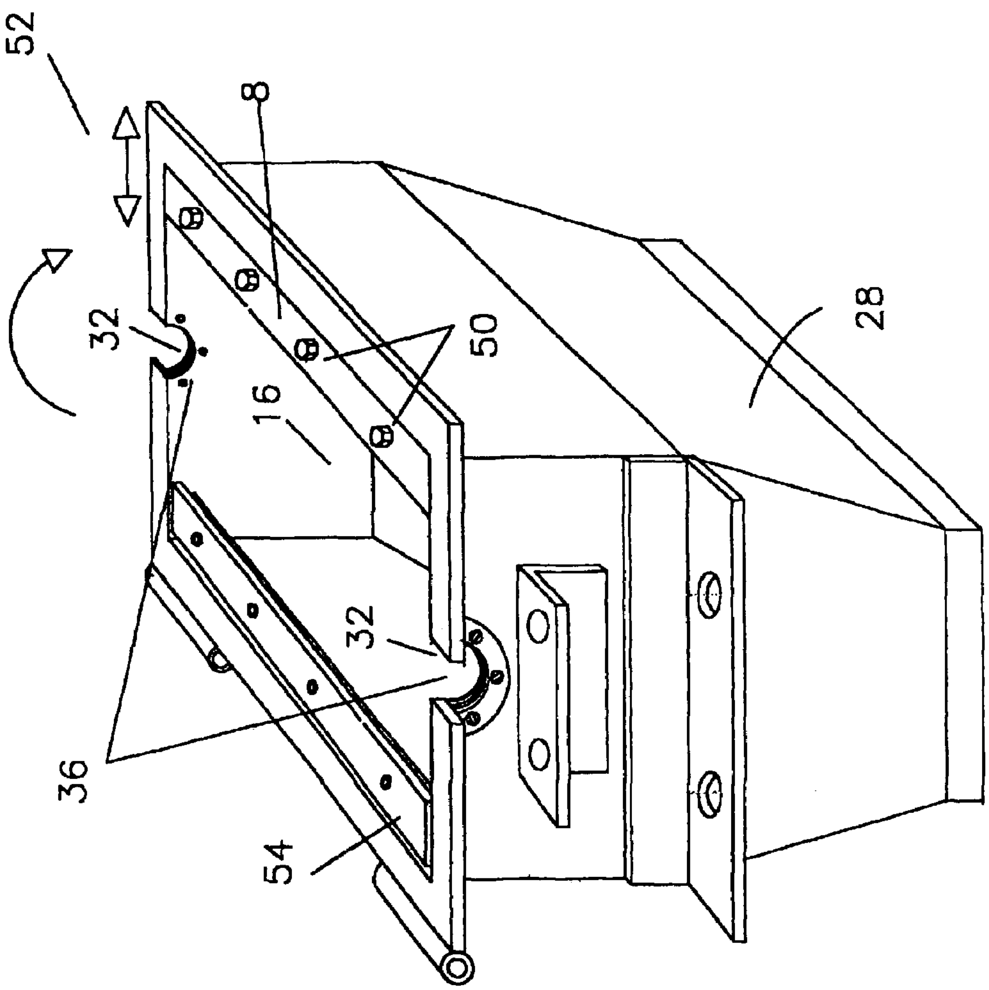
FIG. 3 shows a chamber and stationary blade part of the apparatus shown in FIG. 2.
Figure 4:
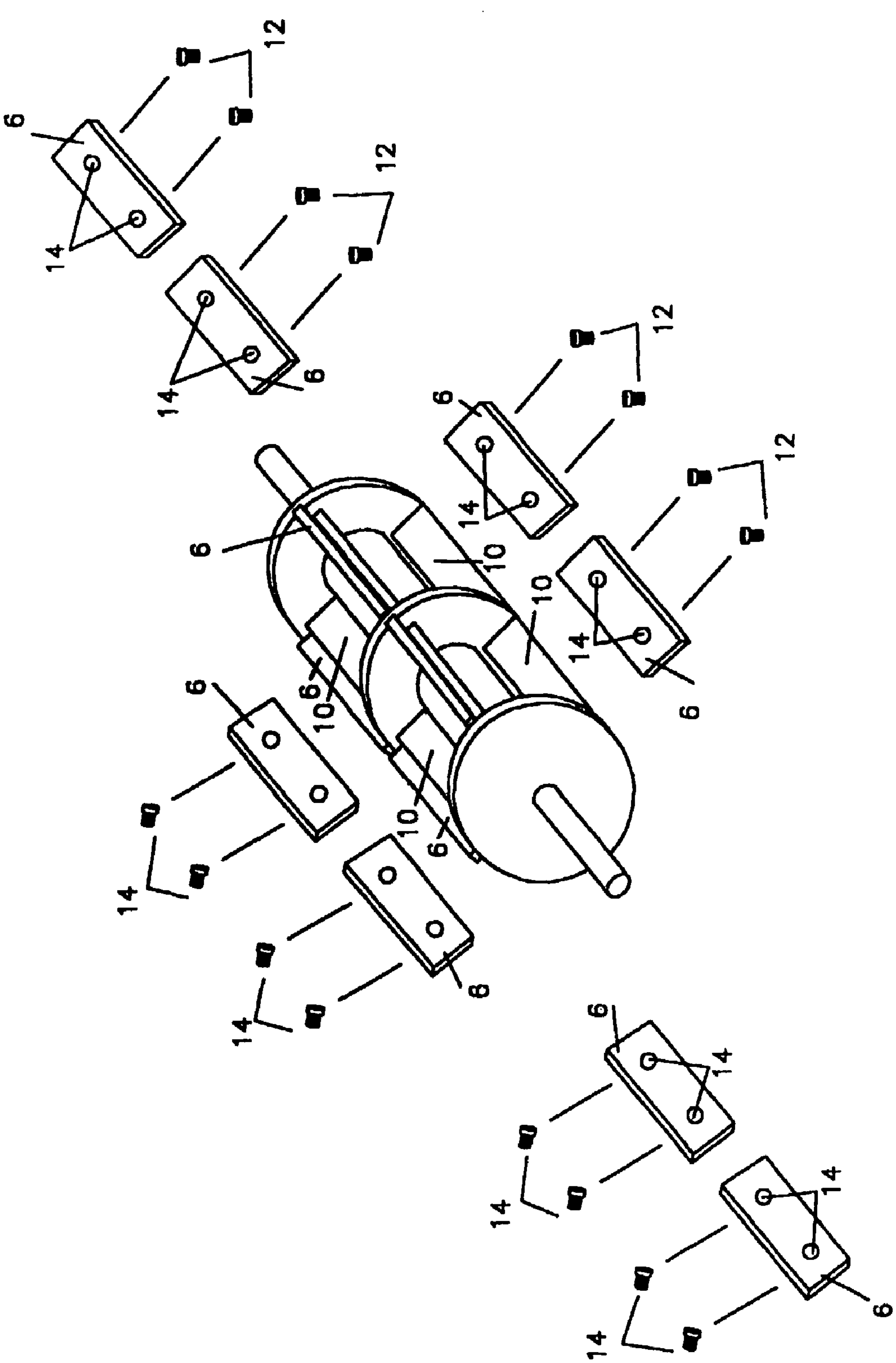
FIG. 4 is an exploded view of a rotor and rotor blades as employed in FIG. 2.

As shown in FIGS. 2 and 3, the chamber 16 is in a housing 28. The housing 28 has an upper edge 30 and a pair of recesses 32 in the upper edge 30. The recesses 32 receive a shaft 34 of the rotor 4. The recesses 32 are provided with retention seals 36 for retaining dust from the cullet 22 in the chamber 16. Without the retention seals 36, the dust could escape from the chamber 32 through the recesses 32 and along the side of the shaft 34.

As shown in FIG. 1, the apparatus 2 includes drive means 38 for driving the rotor 4. The drive means 38 comprises an electric motor 40 having a drive shaft 42. The drive shaft 42 supports a pulley 44 which drives an endless belt 46. The endless belt 46 drives a pulley 48 which is mounted on the shaft 34 of the rotor 4. Thus rotation of the pulley 48 via the endless belt 46, the pulley 44 and the electric motor 40 causes rotation of the rotor 4.

As shown in FIGS. 2 and 3, the stationary blade 8 is held in position by bolts 50. Adjustment of the stationary blade 8 is effected by releasing the bolts 50, adjusting the stationary blade 8 to the required position, and then re-tightening the bolts 50. This adjustment movement is illustrated by arrow 52 in FIG. 3.

As can be seen from FIGS. 2 and 3, the apparatus 2 is provided with a cleaning stationary blade 54 which operates to clean the rotor blades 8 with a scraping action as the rotor 4 rotates. The cleaning stationary blade 54 helps to remove glass fragments from the edges of the rotor blades 6, and thereby helps to make sure that the balance of the rotor is maintained. The rotor blades 6 are then able to act more efficiently in grinding the glass fragments 20 to remove sharp edges from the glass fragments 20 so that the cullet 22 can be handled safely without fear of persons or animals being cut by the cullet 22.

The chute 26 is provided with a lining (not shown) adjacent the rotor 4. The imploding glass has a tendency to erode the chute 26 and the lining helps to prevent this erosion. The lining may be a ceramic lining, a composite lining, or a wear-resistant steel lining.

As can be seen from FIG. 1, the entire apparatus 2 is in a cabinet 56 which can be free-standing and which is arranged for receiving the bottles 18 manually through an opening 58. The bottom of the cabinet 56 may be provided with a pull-out drawer 60 which is pulled out when full and which contains the cullet 22.

Figure 5:
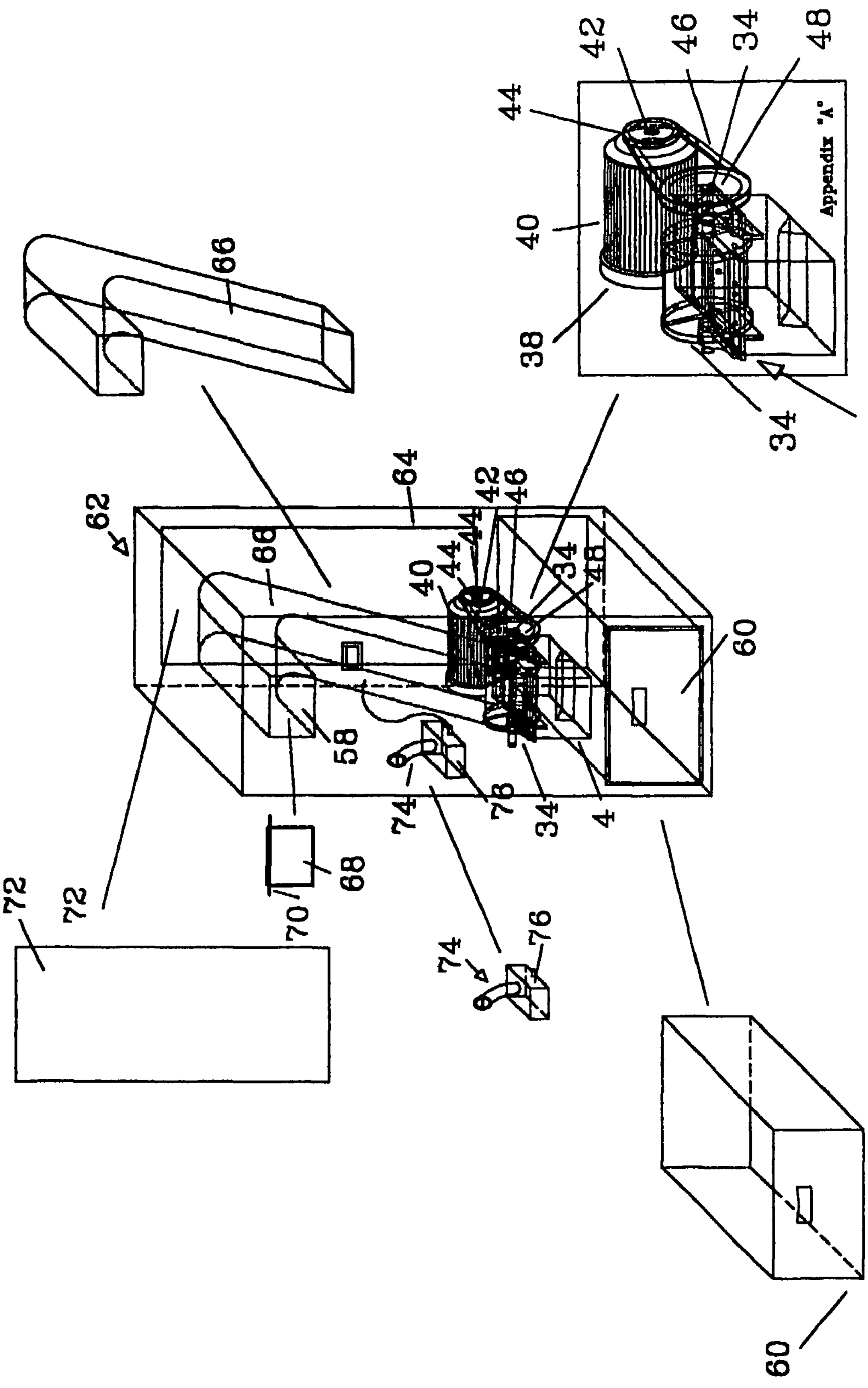
FIG. 5 shows second apparatus of the invention.

FIG. 5 shows second apparatus 62 having a cabinet 64 which is similar to the cabinet 56. The apparatus 62 has a chute 66 which is curved as shown, instead of the straight chute 26 shown in FIG. 1. The chute 66 is an elbow feed chute. The design of the chute 66 is such as to prevent a person being able to insert their arm sufficiently far down the chute 66 to engage the rotor 4. Similar parts in FIGS. 1 and 5 have been given the same reference numerals for ease of comparison and understanding.

The chute 66 is provided with a door 68 which covers the opening 58 to the chute 66. The door 68 pivots about a pivot bar 70 and is spring biased by a spring (not shown) to the closed position.

The cabinet 64 has a removable rear door 72 for enabling access to the components of the apparatus 62 inside the cabinet 64.

The apparatus 62 is also provided with cleaning means 74. The cleaning means 74 comprises a tank 76 for containing chemicals. A pump (not shown) is able to pump chemicals for cleaning and disinfecting the chute 66. The cleaning means 74 is automatically controlled by timed electrical control means (not shown).

Figure 7:
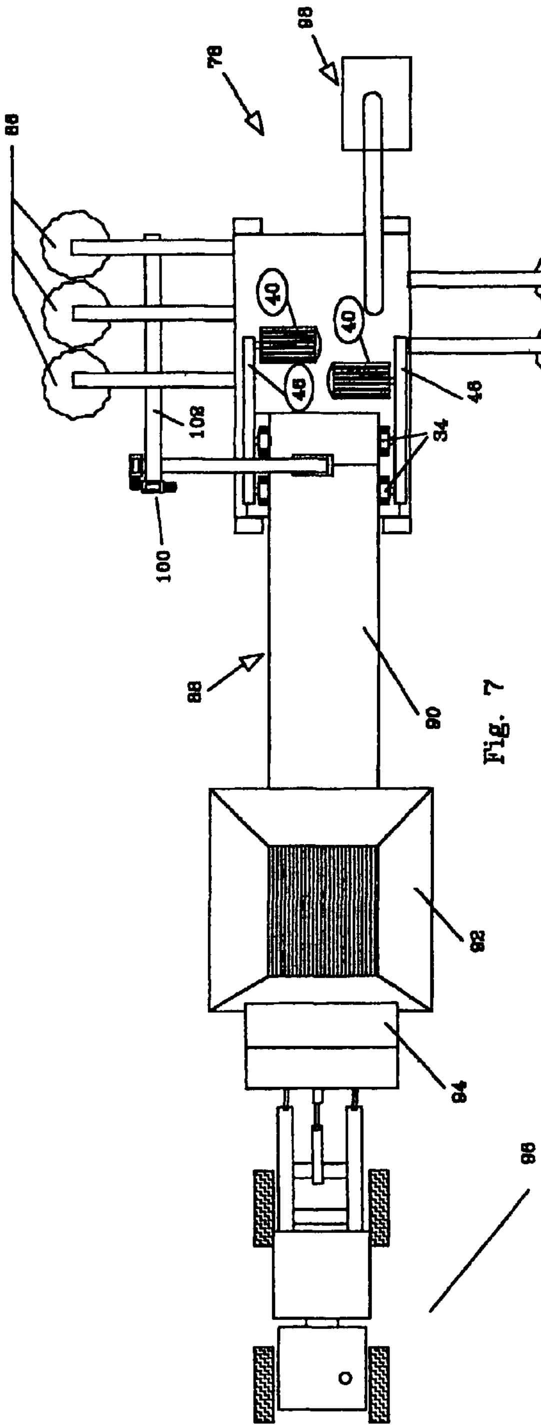
FIG. 7 is a top view of the apparatus shown in FIG. 6.
Figure 6:
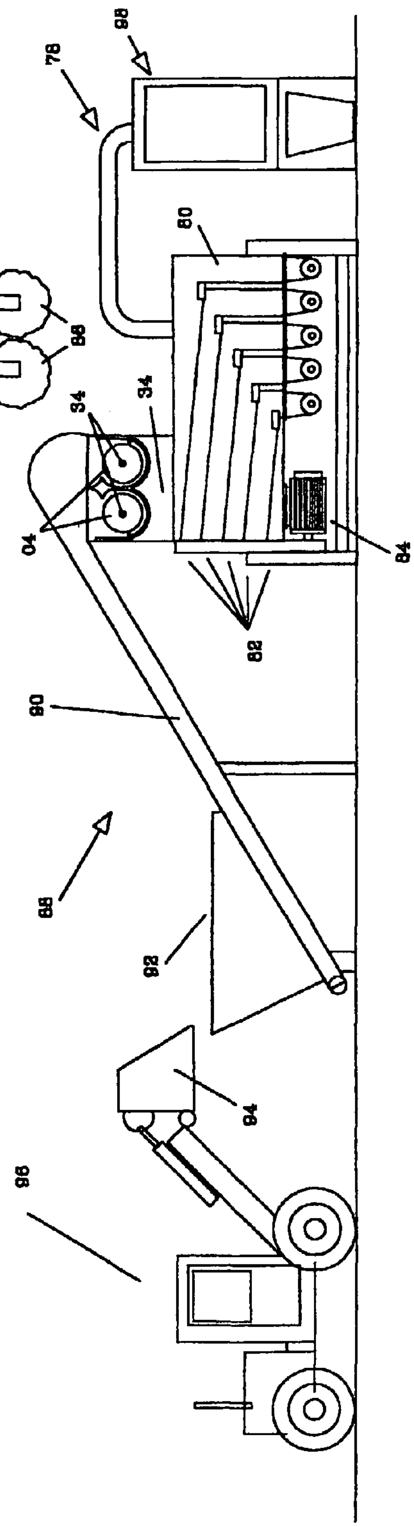
FIG. 6 is a side view of third apparatus of the invention.

Referring now to FIGS. 6 and 7, there is shown third apparatus 78 of the invention.

The apparatus 78 includes two of the rotors 4. The rotors 4 are powered by two electric motors 40 and endless belts 46.

The rotors grind glass fragments 20 into cullet 22 as described above so that the cullet 22 falls into a chamber 16. Cullet from the chamber 16 is able to be graded by cullet grading means 80. The cullet grading means 80 comprises a plurality of different grading screens 82 for grading the cullet 22 into different pre-determined particle sizes for different pre-determined uses. The grading screens 82 are vibrated by vibration means including an electric motor 84. The graded cullet is collected in sacks 86.

The apparatus 78 includes feed means 88 for feeding the glass to the rotor. The feed means 88 comprises a conveyor 90 which is fed with the glass from a feed hopper 92. Glass is fed to the feed hopper 92 via a bucket 94 on a tractor 96 which performs the function of a mechanical shovel.

The apparatus 78 includes filter means 98 for removing dust from the cullet 22. If desired, the filter means 98 may remove dust firstly at a base part of the chamber 16, and secondly at the grading screens 82 as shown in FIGS. 6 and 7.

The apparatus 78 includes re-circulating means 100 as shown in FIG. 7. The re-circulating means 100 includes a re-circulating conveyor 102. The re-circulating means 100 is able to re-circulate graded cullet of a certain particle size for re-processing into cullet of a small particle size.

It is to be appreciated that the embodiments of the invention described above with reference to the accompanying drawings have been given by way of example only and that modifications may be effected. Thus, for example, the apparatus of the invention may include fluid filter means for filtering any fluid contained in the glass prior to crushing, the fluid filter means being such as to separate contaminants from water whereby the water can be freely discharged to waste. The apparatus of the invention may also include a pre-breaking device for breaking up large pieces of glass which are too large easily to be handled by the remainder of the apparatus of the invention. For example, the apparatus 78 shown in FIGS. 6 and 7 may be provided with a pre-breaking device in the form of a crusher or a shredder prior to the feed hopper 92. The apparatus 78 shown in FIGS. 7 and 8 is basically a stationary apparatus. The apparatus 2 shown in FIGS. 1–4 and the apparatus 62 shown in FIG. 5 can be constructed to be stationary or movable as may be desired. The apparatus of the invention may be used for crushing any suitable and appropriate type of glass including bottles, jars, windscreens, laminated glass, plate glass and window glass. The apparatus of the invention may also be used for crushing any suitable and appropriate type of ceramic material.

The apparatus of the invention as shown in the drawings is advantageous in that it enables large amounts of glass and ceramic material which would normally be thrown away as dangerous waste in land-fill sites, to be processed and re-used in a wide variety of applications in complete safety and without the need for further processing.

What is claimed is:

1. Apparatus for crushing glass or ceramic material, which apparatus comprises a rotor, rotor blades on the rotor, at least one stationary blade which cooperates in use with the rotor blades as the rotor rotates, and a chamber for receiving crushed glass or ceramic material, the apparatus being such that the rotor is upstream of the chamber, the rotor is rotated at 1200–2800 revolutions per minute, the glass or ceramic material is fed to the rotor at a feed speed of 3–75 meters per second, the glass or ceramic material is first broken into fragments on impact with the rotor, the fragments are reduced in size and formed into cullet by passing through a gap between the rotor blades and the stationary blade, and the action of the rotor blades and the stationary blade causes the cullet to be such that it will not cut, is safe for handling, and is suitable for further use without further processing.

2. Apparatus according to claim 1 in which the stationary blade is an adjustable stationary blade for the purpose of adjusting the gap between the rotor blades and the stationary blade in order to vary the size of the cullet.

3. Apparatus according to clam 1 and including retention seals for retaining dust in the chamber.

4. Apparatus according to claim 1 and including drive means for the rotor.

5. Apparatus according to claim 1 and including a feed chute along which the glass or ceramic material passes for correct presentation to the rotor.

6. Apparatus according to claim 5 in which the feed chute is an elbow feed chute.

7. Apparatus according to claim 6 in which the feed chute includes a lining for preventing erosion of the feed chute adjacent the rotor.

8. Apparatus according to claim 1 and including feed means for feeding the glass or ceramic material to the rotor.

9. Apparatus according to claim 1 and including cullet grading means for grading the cullet into different predetermined particle sizes for different predetermined further uses.

10. Apparatus according to claim 9 in which the cullet grading means is a rotary screening device, or a vibration screening device.

11. Apparatus according to claim 1 and including filter means for removing dust from the apparatus.

12. Apparatus according to claim 1 and including conveyor means for conveying the graded cullet to a storage container.

13. Apparatus according to claim 1 and including re-circulating means for re-circulating graded cullet of a certain particle size for re-processing into cullet of a smaller particle size.

14. Apparatus according to claim 1 and including filter means for filtering any fluid contained in the glass or ceramic material prior to crushing, the filter means being such as to separate contaminants from water whereby the water can be freely discharged to waste.

15. Apparatus according to claim 1 and including a pre-breaking device for breaking up large pieces of glass or ceramic material before the glass or ceramic material is introduced to the remainder of the apparatus for crushing.

16. Apparatus according to claim 1 and including a stationary cleaning blade which operates to clean the rotor blades with a scraping action as the rotor rotates.

* * * * *